United States Patent
Garnier

[15] 3,667,686
[45] June 6, 1972

[54] ELECTROMAGNETIC FUEL INJECTORS

[72] Inventor: Georges Garnier, Blois, France
[73] Assignee: Roto-Diesel, Clichy (Hauts-de Seine), France
[22] Filed: Aug. 26, 1970
[21] Appl. No.: 67,133

[30] Foreign Application Priority Data
Sept. 15, 1969 France..................6931319

[52] U.S. Cl................................239/585, 239/533
[51] Int. Cl...................................B05b 1/30
[58] Field of Search........................239/533, 585

[56] References Cited
UNITED STATES PATENTS
3,224,677 12/1965 Schmidt et al.............239/585 X
3,288,379 11/1966 Croft et al...................239/533 X Primary Examiner—Lloyd L. King
Attorney—Clelle W. Upchurch

[57] ABSTRACT

Electromagnetic fuel injector comprising a cylindrical body to which is attached an injection nozzle containing a sliding metering pintle in rigidly fixed relation to a movable armature or pallet which is attracted at each injection stroke of the cycle by an inductor formed of a magnetic core which carries a field winding and housed within the said injector body, wherein a stack of grain-oriented laminations which are cut out in the shape of ⊓ and form the inductor core is clamped at the end nearest the movable pallet within a hole formed through a holding disc of non-magnetic material which is stationarily secured within the injector body and at the opposite end by the clamping lips of two strips of non-magnetic metal each located within one of the two recesses which form a separation between the three magnetic arms of the said core and accomodate the field winding which is placed round the central arm, that end of the stack of laminations which is directed towards the movable pallet and that face of the holding disc which is also directed towards the said pallet being placed level with each other so as to form a reference plane which constitutes one side of the airgap.

5 Claims, 11 Drawing Figures

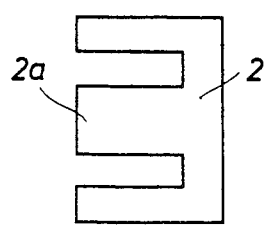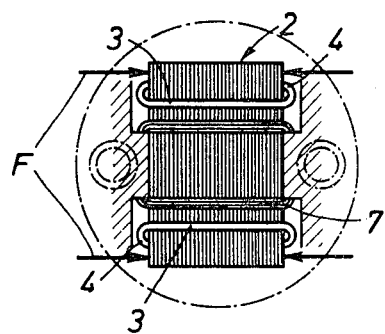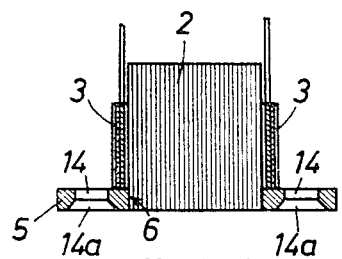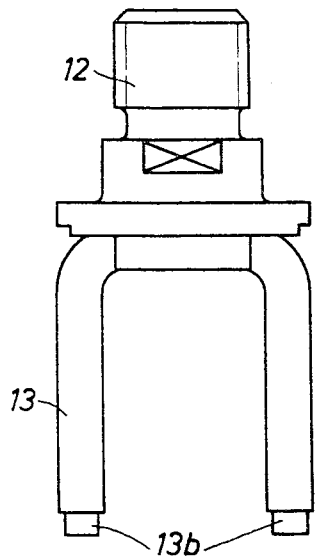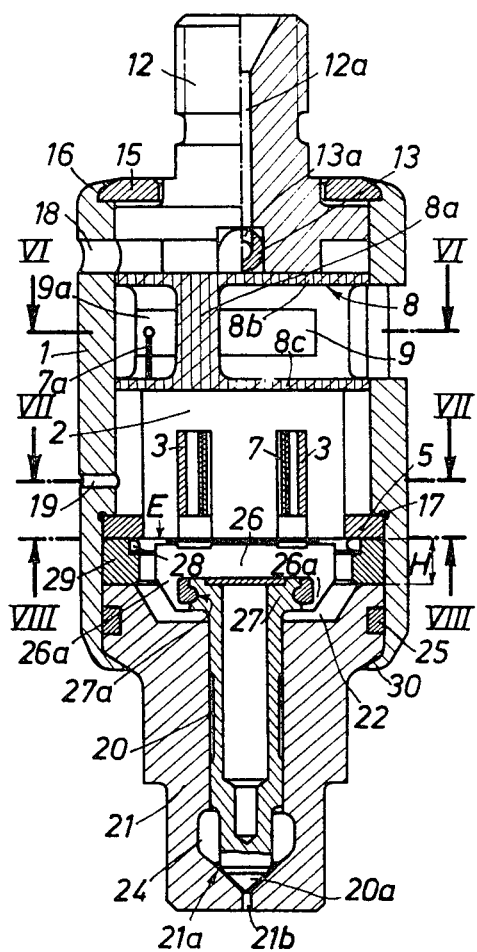

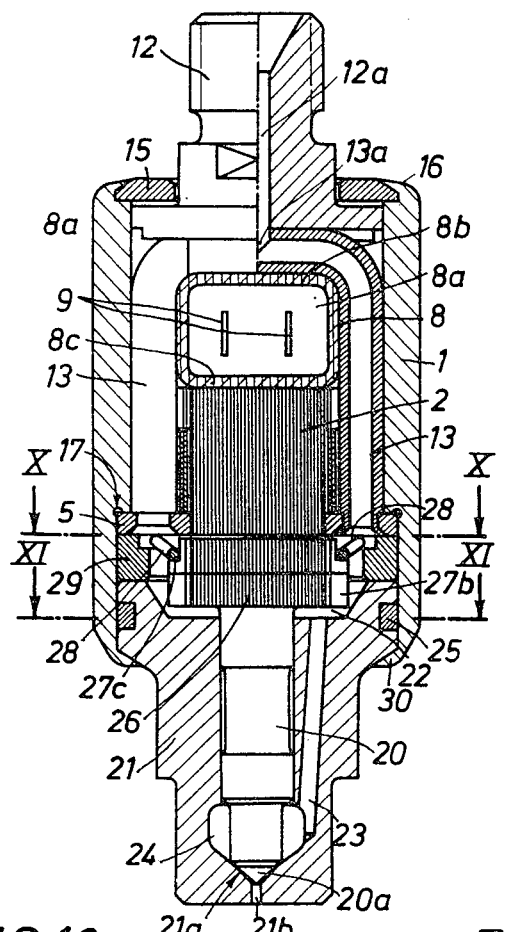
FIG. 9
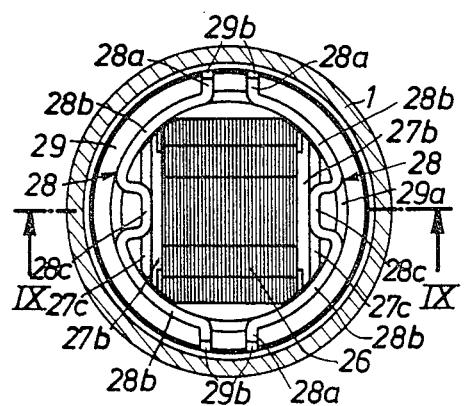
FIG. 10
FIG. 11

ELECTROMAGNETIC FUEL INJECTORS

This invention relates to electromagnetic fuel injectors, namely to fuel-metering valves of the electromagnetic control type which are intended to be mounted on internal combustion engines for regulating the supply of fuel to said engines with an extremely high degree of accuracy. It is thus intended on the one hand to obtain maximum efficiency and on the other hand to promote complete combustion which is as close as possible to ideal criteria, thereby achieving maximum elimination of the atmospheric pollution which is at present observed as a result of fuel supply by means of carburetors and injectors of more or less faulty design.

In injectors of the type now under consideration, the fuel is usually fed to said injectors at constant pressure, the quantity of fuel injected during each cycle of the engine being proportional to the opening time of the injector.

In actual practice, there is a well-known trend towards increasing speeds in present-day internal combustion engines and this therefore dictates the need to design fuel injectors with extremely short operating times.

The aim of the present applicant has been to find a solution to the problem which consists in meeting this essential condition of operation in very short time intervals while arranging the different components of the injector so as to permit of competitive manufacture and at the same time to ensure very high accuracy of operation as well as a high degree of reliability.

The improved injector in accordance with the present invention comprises in known manner a cylindrical body to which is attached an injecting nozzle containing a sliding metering pintle in rigidly fixed relation to a movable armature or pallet which is attracted at each injection stroke of the cycle by an inductor formed of a magnetic core which is adapted to carry a field winding and housed within the said injector body, and is characterized in that a stack of grain-oriented laminations which are cut out in the shape of ⊓ and form the inductor core is clamped at the end nearest the movable pallet within a hole formed through a holding disc of non-magnetic material which is stationarily secured within the injector body and at the opposite and by the clamping lips of two strips of non-magnetic metal each located within one of the two recesses which form a separation between the three magnetic arms of said core and accommodate the field winding which is placed around the central arm, that end of the stack of laminations which is directed towards the movable pallet and that face of the holding disc which is also directed towards said pallet being placed level with each other so as to form a reference plane which constitutes one side of the airgap.

In one advantageous embodiment, the improved injector can also have the following characteristic features:

the holding disc which supports the inductor core is rigidly fixed to the extremities of the arms formed by a tube which is bent into a U-shape, the central portion of the U being joined to the fuel inlet union which is secured by crimping within one extremity of the injector body whilst said central portion of the U-shaped tube is pierced by a hole which provides a communication between the interior of the tube and the axial bore of said union;

the space formed between on the one hand the inductor face which is remote from the movable pallet and on the other hand the central portion of the U-shaped tube is occupied by an insulating casing having a generally circular shape which corresponds to the shape of the interior of the injector body and being provided with connector pins for the supply of electric current which are fixed in a transverse partition wall and the rear extremities of which are joined by soldering to the ends of the fuels winding of the inductor, said insulating casing being further provided on the one hand with two diametrically opposite recesses for the insertion of the two lateral arms of the U-shaped tube and on the other hand with at least one through-bore for the injection into that portion of the injector body which is occupied by the inductor of a synthetic resin which is admitted above the casing through an opening formed in the wall of said injector body;

the extremity of the metering pintle which is located nearest the inductor has an enlarged rectangular head whose opposite sides are provided with two cheeks or flanges between which are mounted laminations constituting the pallet and preferably grain-oriented, the other two opposite sides of said pintle head being provided with two rectilineal grooves defining an enclosed space in conjunction with recesses provided in opposite lugs which are formed on said laminations and fit over the pintle head, said enclosed space being filled with plastic material so as to form a rigid bond between said pintle head and said pallet laminations;

the cheeks or flanges of the pintle head each have a flat portion which serves as a bearing surface for the inwardly-bent central portion of a semi-circular restoring spring of steel wire whose extremities are inserted in slots of a spacer washer, said washer being placed between the nozzle which is crimped within the injector body and the inductor-holding disc and said disc being applied against an internal annular shoulder of said injector body, the arrangement being such that each restoring spring is stressed in torsion.

Further particular features of the invention will be brought out by the following description which relates to one embodiment of the improved electromagnetic fuel injector in accordance with said invention, this embodiment being given solely by way of example without thereby implying any limitation whatsoever and being illustrated diagrammatically in the accompanying drawings, in which:

FIG. 1 is a plan view of one of the core laminations of the inductor or yoke element of the electromagnet;

FIG. 2 is a plan view of the stack of laminations which forms the inductor core;

FIG. 3 is a view in side elevation and partly in cross-section showing the stack of laminations which is clamped within a holding disc;

FIG. 4 is a view in elevation showing the tube of a fuel-admission stirrup-piece which forms a support for assembly;

FIG. 5 is a view which is taken partly in longitudinal cross-section along the line V—V of FIG. 6 and showing the complete electromagnetic injector unit;

FIG. 9 is a view which is taken at right angles to FIG. 5 partly in longitudinal cross-section along the line IX—IX of FIG. 10 and showing the complete injector unit;

FIG. 10 is a view in transverse cross-section along the line X—X of FIG. 9;

FIG. 11 is a view in transverse cross-section along the line XI—XI of FIG. 9.

Figure 6:
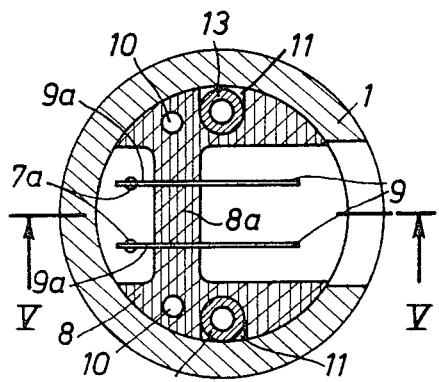
FIG. 6 is a view in transverse cross-section along the line VI—VI of FIG. 5.
Figure 7:
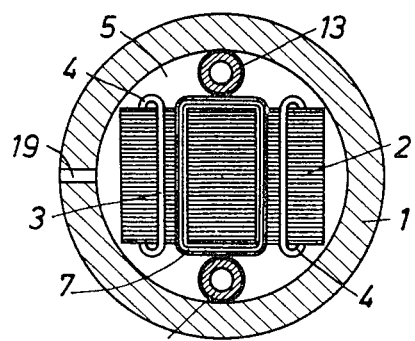
FIG. 7 is a view in transverse cross-section along the line VII—VII of FIG. 5.
Figure 8:
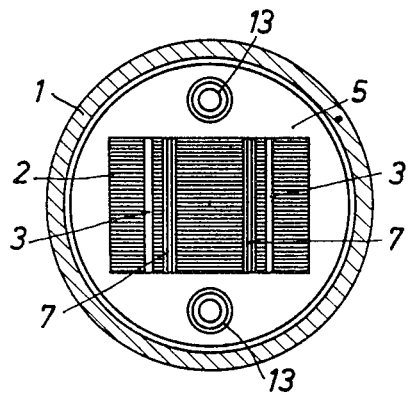
FIG. 8 is a view in transverse cross-section along the line VIII—VIII of FIG. 5.

The injector body is designed in the general form of a cylindrical steel sleeve 1, the upper and lower end of which are formed respectively by the fuel inlet union and by the nozzle to which further reference will be made hereinafter, The magnetic core of the inductor unit which is placed within the injector body 1 is formed of grain-oriented laminations 2 which are cut in the shape of ⊓ as shown in FIG. 1.

The thin sheets or laminations 2 which are assembled so as to form a stack and compressed in the direction of the arrows F shown in FIG. 2 are on the one hand maintained clamped together by means of strips 3 provided with lips 4 and on the other hand forcibly fitted within a hole 6 formed right through a retaining disc 5 (as shown in FIGS. 2 and 3). The aforesaid strips as well as the disc 5 are formed of non-magnetic material such as bronze or beryllium.

This assembly is obtained as follows:

The layer of carlite which is present at the surface of the laminations results in swelling which permits compression of these latter in much the same manner as a spring.

During compression of the stack of laminations, the two strips 3 are inserted therein and the lips 4 of said strips grip the stack of laminations over which the disc 5 is then placed, said disc being applied on the one hand against the strips 3 and on the other hand against the stack of laminations 2 while being located flush with the lower end of said stack and exerting a clamping action on this latter.

When compressive forces in the direction of the arrows F are no longer applied, the laminations 2 are securely maintained against the lips 4 of the strips 3 and within the housing 6 of the disc 5.

There is thus obtained a rigid core, the bottom plane of which forms a reference plane as designated by the letter P in FIG. 3 and constitutes one side of the airgap.

The central arm 2a of the stack of laminations 2 carries the field winding 7.

A casing 8 having a transverse partition wall 8a is housed within the injector body 1 above the inductor unit (formed by the elements 2, 3, 5, 7), that is to say opposite to the airgap face which corresponds to the plane P. Said casing is formed of insulating material and is fitted with electric connector pins which are rigidly fixed in the partition wall 8a and capable of receiving the means (not shown) for connection to the control current supply.

The rear extremity 9a of the two connector pins 9 is joined by welding to the corresponding extremity 87a of the field winding 7.

The casing 8 is delimited at the top and bottom by two circular end-walls 8b and 8c which conform to the cylindrical internal shape of the injector body 1 and is provided with two through bores 10 and with two recesses 11.

The fuel-inlet union 12 in which is formed an axial bore 12a is rigidly fixed to the central branch of tube 13 which is bent into the shape of a U and pierced by a hole 13a which communicates with the bore 12a. The two arms of the tube 13 are inserted in the recesses 11 of the casing 8 and the extremities of said arms each terminate in a portion 13b of smaller diameter. Said extremities are engaged in two holes 14 of the disc 5 and are riveted by expansion into the flared-out portions 14a of said holes.

This arrangement is highly advantageous since it permits the possibility on the one hand of mounting the casing 8 and the inductor (core 2 and winding 7) together with the disc 5 on the support which is formed by the U-shaped tube 13 and on the other hand of joining the extremities 7a of the field winding 7 to the rear extremities 9a of the connector pins 9 by soldering, the complete unit which is thus formed being finally mounted within the body 1 which is closed at the top by a disc 15, said disc being secured in position by means of a swaged edge or a crimp 16 formed at the corresponding extremity of the injector body, the disc 5 being then applied against an annular shoulder 17 within said body.

The different elements hereinabove described are scaled within the injector body 1 by means of a resin of the epoxy type, for example. Said resin is injected through a hole 18 of the body 1 and passes through the bores 10 of the casing 8 whilst a second hole 19 of the body 1 serves as a vent.

The fuel-metering valve (as shown in FIGS. 5, 9, 11) comprises in known manner a needle or pintle 20 which is capable of sliding within a nozzle 21. The pintle 20 (which is of hollow construction in order to be lighter in weight) has a conical lower end 20a which is adapted to cooperate with a seating 21a of the nozzle 21. Said seating terminates in a calibrated orifice 21b and this latter serves to regulate the quantity of fuel which flows out while the pintle 120 is in the uplifted position. The invention is also clearly applicable in the case in which the injector is provided with a spray-tip nozzle instead of a nozzle of the single-orifice type.

In order to reach the discharge orifice 21b, the fuel which is admitted through the two branches of the U-shaped tube 13 penetrates into the cavity 22, flows from said cavity via the ducts 23 into the chamber 24 which is located near the seating 21a.

Leak-tightness between the injector body 1 and the nozzle 21 is ensured by means of an O-ring seal 25, said seal being fitted within a circular groove of the upper extremity of the nozzle which is engaged in the body 1.

As shown in FIGS. 5 and 9, the movable armature or pallet which closes the magnetic circuit is constituted in known manner by a stack of grain-oriented laminations 26 which are rigidly fixed to the sliding pintle 20. To this end, the upper portion of the pintle has the shape of a projecting rectangular head 27 provided with two opposite rectilineal grooves 27a and at right angles to said grooves with two flanges or endplates 27b.

The laminations 26 which are inserted between the two flanges 27b and surmount the pintle head 27 are provided at each end with a downwardly extending lug 26a. A recess formed in said lug and located opposite to each groove 27a defines with this latter and at each end an enclosed space into which is injected a plastic material, thereby forming a rigid bond between the laminations 26 and the pintle 20.

The flanges 27b are provided with annular shoulders 27c against which are applied restoring springs 28. Said flanges project to a distance E beyond the plane defined by the top face of the stack of laminations 26 (the face which is located opposite to the plane P as defined by the bottom face of the inductor core). This distance E represents the minimum value of the airgap when the movable pallet is attracted by the inductor in the energized state (that is to say when the pintle 20 is lifted).

The travel of the moving system as constituted by the pintle 20 and laminations 26 is defined by the height H of a spacer washer 29 which is interposed between the top face of the nozzle 21 and the bottom face (plant P) of the disc 5. The washer 29 is provided with a marginal annular groove 29a and with four slots 29b in which the springs 28 are fitted. Said springs which are each formed of steel wire (of the "piano wire" type) each have two extremities 28a which are inserted in the slots 29b, two curved portions 28b are fitted in the groove 29a and a central inwardly bent portion 28c which is applied against the corresponding annular shoulder 27c of one of the flanges 27. The arrangement of the restoring springs and bearing points is such that the curved portions 28b are stressed in torsion when the central portion 28c is subjected to an effort.

The complete injector unit is assembled by means of a swaged rim or crimp 30 which serves to join the body 1 to the nozzle 21.

When the winding 7 is energized, the movable pallet travels towards the inductor as in the case of known injectors, is accompanied in its motion by the pintle 20 and the fuel under pressure is injected.

When current is no longer supplied to the winding 7, the restoring springs 28 return the pintle 20 to the closed position and the injection is then stopped.

What I claim is:

1. An electromagnetic fuel injector comprising a cylindrical body to which is attached an injection nozzle containing a sliding metering pintle in rigidly fixed relation to a movable armature or pallet which is attracted at each injection stroke of the cycle by an inductor formed of a magnetic core which carries a field winding and housed within the said injector body, wherein a stack of grain-oriented laminations having the shape of ⊓ form the inductor core which is clamped at the end nearest the movable pallet within a hole formed through a holding disc of non-magnetic material which is stationarily secured within the injector body and at the opposite end by the clamping lips of two strips of non-magnetic metal each located within one of the two recesses which form a separation between the three magnetic arms of the said core and accommodate the field winding which is placed round the central arm, that end of the stack of laminations which is directed towards the movable pallet and that face of the holding disc which is also directed towards the said pallet being placed level with each other so as to form a reference plane which constitutes one side of the airgap.

2. An electromagnetic injector in accordance with claim 1, wherein the holding disc which supports the inductor core is rigidly fixed to the extremities of the arms formed by a tube which is bent into a U-shape, the central portion of the U being joined to the fuel inlet union which is secured by crimping within one extremity of the injector body whilst the said central portion of the U-shaped tube is pierced by a hole which provides a communication between the interior of the tube and the axial bore of the said union.

3. An electromagnetic injector in accordance with claim 2, wherein the space formed between on the one hand the inductor face which is remote from the movable pallet and on the other hand the central portion of the U-shaped tube is occupied by an insulating casing having a generally circular shape which corresponds to the shape of the interior of the injector body and being provided with connector pins for the supply of electric current which are fixed in a transverse partition wall and rear extremities of which are connected by soldering to the ends of the field winding of the inductor, the said insulating casing being further provided on the one hand with two diametrically opposite recesses for the insertion of the two lateral arms of the U-shaped tube and on the other hand with at least one through bore for the injection into the portion of the injector body which is occupied by the inductor of a synthetic resin which is admitted above the casing through an opening formed in the wall of the said injector body.

4. An electromagnetic injector in accordance with claim 1 wherein the extremity of the metering pintle which is located nearest the inductor has an enlarged rectangular head whose two opposite sides are provided with two flanges between which are mounted laminations constituting the pallet the other two opposite sides of the said pintle head being provided with two rectilineal grooves defining an enclosed space in conjunction with recesses provided in opposite lugs which are formed on the said laminations and fit over the pintle head, the said enclosed space being filled with plastic material whereby a rigid bond is formed between the said pintle head and the said pallet laminations.

5. An electromagnetic injector in accordance with claim 4, wherein the cheeks or flanges of the pintle head each have a flat portion which serves as a bearing surface for the inwardly bent central portion of a semi-circular restoring spring of steel wire whose extremities are inserted in slots of a spacer washer, the said washer being placed between the nozzle which is crimped within the injector body and the inductor holding disc and the said disc being applied against an internal annular shoulder of the said injector body, the arrangement being such that each restoring spring is stressed in torsion.

* * * * *